United States Patent
Sato

(10) Patent No.: US 6,640,099 B1
(45) Date of Patent: Oct. 28, 2003

(54) WIRELESS INFORMATION TRANSMISSION SYSTEM TRANSMITTING AND RECEIVING ANY CONTINUOUS INSTRUCTION INPUT AT PREDETERMINED INTERVALS

(75) Inventor: Koji Sato, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/541,080

(22) Filed: Mar. 31, 2000

(30) Foreign Application Priority Data

Mar. 31, 1999 (JP) .......................................... 11-090520
Mar. 8, 2000 (JP) .................................. 2000-063559 (P)

(51) Int. Cl.$^7$ ................................................ H04Q 7/20
(52) U.S. Cl. ........................ 455/420; 455/3.06; 341/22
(58) Field of Search ................................ 455/3.02, 3.06, 455/420, 18, 24, 41, 507, 510, 517, 69, 68, 70, 74, 550, 556, 557, 574, 575, 91, 92, 66; 341/20, 22, 26, 25, 124; 345/168, 169; 370/428, 349; 463/37, 39

(56) References Cited

U.S. PATENT DOCUMENTS

| | | | | | |
|---|---|---|---|---|---|
| 5,861,822 A | * | 1/1999 | Park et al. | .................... | 341/22 |
| 5,958,023 A | * | 9/1999 | Klein | ......................... | 710/18 |
| 5,977,886 A | * | 11/1999 | Barile et al. | .................. | 341/20 |
| 5,990,868 A | * | 11/1999 | Frederick | .................... | 345/158 |
| 6,028,538 A | * | 2/2000 | Ramesh et al. | ............... | 341/24 |
| 6,052,116 A | * | 4/2000 | Takagi | ......................... | 345/169 |
| 6,178,527 B1 | * | 1/2001 | Vidales | ......................... | 714/44 |
| 6,213,880 B1 | * | 4/2001 | Sim | ............................. | 463/37 |
| 6,304,250 B1 | * | 10/2001 | Yang et al. | .................. | 345/168 |
| 6,330,435 B1 | * | 12/2001 | Lazraq et al. | ............... | 455/412 |

FOREIGN PATENT DOCUMENTS

JP 2766125 * 4/1988

* cited by examiner

Primary Examiner—Lee Nguyen
Assistant Examiner—Jean A Gelin
(74) Attorney, Agent, or Firm—Birch, Stewart, Kolasch & Birch, LLP

(57) ABSTRACT

A wireless information transmission system with reduced power consumption includes a wireless transmit device transmitting information by wireless signal and a wireless receive device receiving information transmitted from the wireless transmit device. The wireless transmit device includes any input portion for user to input instructions therethrough, a transmit portion transmitting data, and an information generation control portion transmitting any continuously input instruction to the wireless receive device via the transmit portion at predetermined intervals. The wireless receive device includes a receive portion receiving data from the wireless transmit device, a memory portion temporarily storing the data from the wireless transmit device, and an information conversion control portion relying on the data received by the receive portion and the data stored in the memory portion to output data to an application program via an interface (I/F) bridge control portion.

20 Claims, 14 Drawing Sheets

# WIRELESS INFORMATION TRANSMISSION SYSTEM TRANSMITTING AND RECEIVING ANY CONTINUOUS INSTRUCTION INPUT AT PREDETERMINED INTERVALS

BACKGROUND OF THE INVENTION

1. Field of the Invention

The present invention relates generally to wireless information transmission systems including a wireless transmit device and a wireless receive device communicating information with each other, and particularly to wireless information transmission systems free of illegal operations if there is an interruption in transmission of information between the wireless transmit device and the wireless receive device.

2. Description of the Background Art

Information apparatus like computers can have a wireless system connecting a main unit of the computer with its peripherals such as a mouse or a keyboard. In such system, data input is transmitted from peripherals to the main unit by wireless.

For example, whenever a key is pressed or released on a keyboard, the code assigned to the key is transmitted to the main unit by wireless. After receiving the code, the main unit decodes it and provides a predetermined input/output operation.

A main unit of a computer can support an auto-repeat function to repeatedly input the data corresponding to a code received from a peripheral to an application program if the code from the peripheral is not followed by any codes that are received within a predetermined period of time. If the main unit with such auto-repeat function supported receives a code indicating that a key is pressed and thereafter fails to receive a code indicating that the key is released, unintended data will be continuously inputted until a code indicating that a next key is pressed is actually received. To overcome such disadvantage, a method is disclosed in Japanese Patent Publication No. 2766125.

Reference will now be made to FIG. 14 to describe one example of an operation according to the method disclosed in the publication. For example, when on a keyboard the "A" key is pressed, a main unit of a computer receives a Press code and thus recognizes that the "A" key is pressed and the main unit thus inputs a letter "a" to an application program. When the "A" key is released on the keyboard, the main unit receives a Release code and thus recognizes that the "A" key is released and the main unit thus stops inputting the letter "a."

When on the keyboard the "B" key is pressed, the main unit recognizes that the "B" key is pressed and thus inputs a letter "b" to the application program. However, if the main unit fails to receive a code indicating that the "B" key is released when the "B" key is released, then the letter "b" would be repeatedly inputted to the application program.

To overcome such disadvantage, the keyboard calculates the number of keys being pressed which is in turn transmitted as press-count information to the main unit. The main unit can refer to the press-count information consecutively to determine the condition of the keyboard and thus determine that the key has been released. When the keys of the keyboard are all released, data indicating a press count of zero is transmitted from the keyboard to the main unit. As such, if the main unit fails to receive a code indicating that the "B" key is released, it can check that any keys are not being pressed. Thus the main unit can stop repeatedly inputting the letter "b."

This method is applicable to a toggle operation which, as with the Caps Lock key, switches between setting and canceling an input mode in response to a series of output codes indicating that a key is pressed or released. More specifically, if a main unit of a computer fails to receive a code indicating that the Caps Lock key is released, the main unit can refer to the press-count information consecutively to be informed that the Caps Lock key is released. Thus the toggle operation can be provided accurately and consistency between the condition of the keyboard and the condition of the main unit can be maintained.

In accordance with the above method, however, the exact key data indicating the press count of zero will not be transmitted when a failure occurs in a communication channel, e.g., when after a key is pressed the exact key data is still not transmitted for a period of time or transmitted at all. For example, the exact key data indicating the press count of zero will not be transmitted if a fatal error occurs in a keyboard's wireless transmit portion or a main unit's wireless receive portion. As such, as shown in FIG. 15, the auto-repeat condition is maintained until the communication channel recovers or until the key information including the initial-press count is communicated after the recovery of the communication channel. This means that if the keyboard suffers abnormal communication, the main unit in effect normally operating appears to operate illegally, and there also be incurred a possibility of delay of other applications or the entire system fault.

Furthermore, in the above method, even after a keyboard has its keys all released a Release code indicating that any key is not pressed is repeatedly transmitted at intervals as predetermined. This complements cancellation of a repeated input when data reception fails, by repeatedly transmitting a state indicating that any key is not pressed, and is also required for preventing the above-mentioned apparent illegal operations. On the other hand, the keyboard transmits a wireless signal in spite that there is not an event that a key is in effect passed. Therefore, this method has significantly bad effects for battery-driven wireless equipment and thus results in a wasteful power consumption.

SUMMARY OF THE INVENTION

The present invention has been made to overcome the above disadvantage.

The present invention contemplates a wireless information transmission system prevented from consecutive auto-repeat condition entered if a failure has occurred in a communication channel.

The present invention also contemplates a wireless information transmission system reducing wasteful power consumption.

In accordance with the present invention in one aspect a wireless information transmission system includes a wireless transmit device transmitting information by wireless signal and a wireless receive device receiving information by wireless signal from the wireless transmit device. The wireless transmit device includes an input portion for a user to input an instruction therethrough, a transmit portion transmitting information to the wireless receive device by wireless signal, and an information generation control portion connected to the input portion and the transmit portion of the transmit device, to transmit instructions at predetermined intervals while input continues from the input portion. The wireless receive device includes a receive portion receiving an instruction transmitted from the wireless transmit device by wireless, and an operation portion connected to the receive portion of the receive device to operate according to the instruction received by the receive portion on the receive device.

Since the wireless transmit device can transmit at predetermined intervals while an instruction input sustains from the input portion, the wireless transmit device can provide a transmission of the instruction minimized as required to achieve reduced power consumption and the instruction can also be used for detection of communication-channel failure.

The input portion may include equipment having a single or multiple keys, buttons, touch panels and the like for input, such as a mouse, a keyboard and a remote controller.

Preferably the wireless transmit device also includes a receive portion receiving information transmitted from the wireless receive device. The wireless receive device also includes a transmit portion by wireless signal to transmit information to the wireless transmit device.

Between the wireless transmit device and the wireless receive device there can be provided a bi-directional communication. As such, the wireless transmit device and the wireless receive device can exchange data, as appropriate, to provide an enhanced reliability of data transmission.

Still preferably, when the instruction from the wireless transmit device is not received for a period of time, the operation portion transmits a request to retransmit the instruction to the wireless transmit device via the transmit portion of the receive device. When the request to retransmit the instruction is received via the transmit device's receive portion the information generation control portion retransmits the instruction via the transmit portion.

In case that a request to retransmit the instruction is made and the instruction is still not received, the wireless receive device can determine that a failure has occurred in a communication channel. As such, if with an instruction being transmitted a failure has occurred in a communication channel, the wireless receive device can independently cancel an auto-repeat condition of an input.

Still preferably if any instruction is not received from the wireless transmit device for a predetermined period of time the operation portion determines that the wireless transmit device completes providing an instruction.

The wireless receive device, with a decision made that the wireless transmit device completes providing the instruction, can provide a process such as canceling repeat function, without being affected by the failure in the communication channel.

Still preferably the wireless transmit device also includes a receive portion receiving information transmitted from the wireless receive device by wireless signal. The wireless receive device also includes a transmit portion transmitting information to the wireless transmit device by wireless signal. The information generation control portion responds to an information-transmission permitting signal received from the wireless receive device via the transmit device's receive portion for transmitting the instruction from the input portion to the wireless receive device via the wireless transmit device's transmit portion, and while the instruction continues from the input portion, for transmitting the instruction whenever the information-transmission permitting signal is received a first predetermined number of times. Whenever a predetermined process completes the operation portion transmits the information-transmission permitting signal via the wireless receive device's transmit portion to the wireless transmit device.

In case that an instruction is inputted continuously from the input portion, the wireless transmit device transmits the instruction whenever it receives an instruction from the wireless receive device a first, predetermined number of times. Thus the wireless transmit device can provide a transmission of the instruction minimized as required to achieve reduced power consumption.

Still preferably, when in spite that the information-transmission permitting signal is received a second, predetermined number of times any instruction is still not received from the wireless transmit device, the operation portion determines that the wireless transmit device completes providing an instruction.

The wireless receive device, with a decision made that the wireless transmit device completes providing an instruction, can provide a process such as canceling a repeat function without being affected by the failure in the communication channel.

Still preferably, if a single instruction is continuously transmitted, for any transmission(s) of the single instruction subsequent to a first transmission thereof the information generation control portion transmits status information indicating that the same, single instruction as initially transmitted is transmitted.

When a single instruction continues, the instruction can be transmitted only once, thereafter status information can be transmitted. As such, the wireless transmit device can transmit a reduced amount of data to the wireless receive device, and as a result it can achieve a reduced power consumption.

In accordance with the present invention in another aspect a wireless transmit device is used in a wireless information transmission system including a wireless transmit device transmitting information by wireless signal and a wireless receive device receiving information transmitted from the wireless transmit device by wireless signal. The wireless transmit device includes an input portion for user to input an instruction therethrough, a transmit portion transmitting information to the wireless receive device by wireless signal, and an information generation control portion connected to the input portion and the transmit portion to transmit via the transmit portion at predetermined intervals while any instruction input continues from the input portion.

In accordance with the present invention in still another aspect, a wireless receive device is used in a wireless information transmission system including a wireless transmit device transmitting information by wireless signal and a wireless receive device receiving information transmitted from the wireless transmit device by wireless signal. The wireless receive device includes a receive portion receiving an instruction transmitted from the wireless transmit device by wireless signal, and an operation portion connected to the receive portion and operating according to an instruction received by the receive portion and determining that the wireless transmit device completes providing an instruction if any instruction is not received from the wireless transmit device for a predetermined period of time.

When in the wireless transmit device the information generation control portion detects that an event that a key is pressed has occurred, the information generation control portion changes a key status for the key to a Press state. The information generation control portion transmits key data for the pressed key to the wireless receive device via the transmit device's transmit portion.

The information generation control portion transmits the key data and also holds the pressed key's status until the key is released, and determines the status whenever a defined period of time elapses. As shown in FIG. 1, if a held status does not change or a key is kept pressed, the key data which is identical to that previously transmitted is transmitted to the wireless receive device.

As such, with a key being pressed, wireless data is transmitted whenever the defined period of time elapses. If a key status is held in the Press state, the wireless receive device expects that the wireless transmit device should transmit the same data at least once whenever the defined period of time elapses.

If the same data is not received from the wireless transmit device within the defined period of time, then the operation portion determines that a failure has occurred in a communication channel, and the operation portion, with an auto-repeat condition entered, cancels such state and, without the auto-repeat condition entered, prevents the state from being entered.

A description will now be provided of a wireless information transmission system with a wireless transmit device and a wireless receive device each having a transmit portion and a receive portion. When an event that a key is pressed has occurred, the information generation control portion of the wireless transmit device, as well as that of the previously mentioned wireless information transmission system, changes the key's status to a Press state and transmits key data to the wireless receive device via the transmit device's transmit portion.

The information generation control portion, until a pressed key is released, transmits the same data as previously transmitted key data or status information indicating the same input provided via a key, to the wireless receive device repeatedly at predetermined intervals.

With any key held in the Press state, the wireless receive device expects that it should receive the same data from the wireless transmit device at least once whenever a predetermined period of time elapses. However, if within the predetermined period of time the wireless receive device does not receive from the wireless transmit device the same data or a status indicating the same input provided via a key, then the wireless receive device's operation portion determines a failure has occurred in a communication channel. Then to check such failure the wireless receive device transmits control data (a request to retransmit data) to the wireless transmit device. The wireless transmit device receives the control data from the wireless receive device and thus retransmits the key code.

The wireless receive device after the control data is transmitted determines whether data reception is achieved and a content of received data. If the same data or status information indicating the same input provided via a key is not received and the auto-repeat condition is also entered, the wireless receive device performs a process to cancel the auto-repeat condition. If the auto-repeat condition is not entered, then the wireless receive device performs a process to prevent the auto-repeat condition from being entered.

Furthermore, when the wireless receive device's operation portion recognizes that in a communication channel a failure has occurred, the operation portion transmits control data to the wireless transmit device. Simultaneously the operation portion, with the auto-repeat condition entered, performs a process to cancel such state and, without the auto-repeat condition entered, performs a process to prevent the auto-repeat condition from being entered.

A description will now be provided of a wireless information transmission system wherein a wireless receive device's operation portion provides to a wireless transmit device a permission to transmit information and according such permission the wireless transmit device transmits information.

When an event that a key is pressed has occurred, the wireless transmit device's information generation control portion, as well as the previously mentioned wireless transmit device's information generation control portion, changes a status for the key to the Press state, the information generation control portion generates key data to be transmitted to the wireless receive device and then waits for a permission to transmit information that is provided from the wireless receive device. It is not until such permission is received from the wireless receive device that the information generation control portion transmits the key data to the wireless receive device.

Also, until the key is released, the wireless transmit device repeatedly transmits to the wireless receive device the same data as previously transmitted key data or status information indicating the same input provided via a key whenever it receives from the wireless receive device a permission to transmit information a first, predetermined number of times.

With a specific key held in the Press state, the wireless receive device expects that it should receive data from the wireless transmit device at least once whenever it transmits a permission to transmit information a second, predetermined number of times. It should be noted that the second, predetermined number of times is larger in value than the first, predetermined number of times.

However, if within the second, predetermined number of times the wireless receive device does not receive from the wireless transmit device the same data or a status indicating the same input provided via a key, the wireless receive device's operation portion determines a failure has occurred in a communication channel. To check such failure the wireless receive device may transmit control data to the wireless transmit device. The wireless transmit device receives the control data from the wireless receive device and thus retransmits the key code.

The wireless receive device's operation portion after the control data is transmitted determines whether data reception is achieved and a content of received data. If the same data or status information indicating the same input via a key is not received and the auto-repeat condition is also entered, the operation portion performs a process to cancel the auto-repeat condition. If the auto-repeat condition is not entered, then the operation portion performs a process to prevent the auto-repeat condition from being entered.

The wireless transmit device's input portion may be configured of a plurality of components. For example, it may be a keyboard with a plurality of keys together with a pointing device such as a trackball mounted.

In such apparatus as configured above, there exist in parallel a portion which processes signals input via the pointing device and a portion which processes signals input via the keyboard. As such, the information generation control portion may deal with such input signals collectively. More specifically, if there are a plurality of input portions, the information generation control portion directly controlling the transmit portion of the transmit device can eliminate the necessity of providing for each input portion a mechanism exclusively using the transmit portion. From an event independently occurring from each input portion the information generation control portion generates data to be transmitted and transmits the data via the transmit portion to the wireless receive device.

In preparation for events simultaneously occurring from multiple input portions, a predetermined format may be provided to allow multiple events to be transmitted in single data. This allows the information generation control portion to notify the wireless receive device of multiple events in single data.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Reference will now be made to the drawings to describe a wireless information transmission system according to a first embodiment of the present invention.

Figure 1:
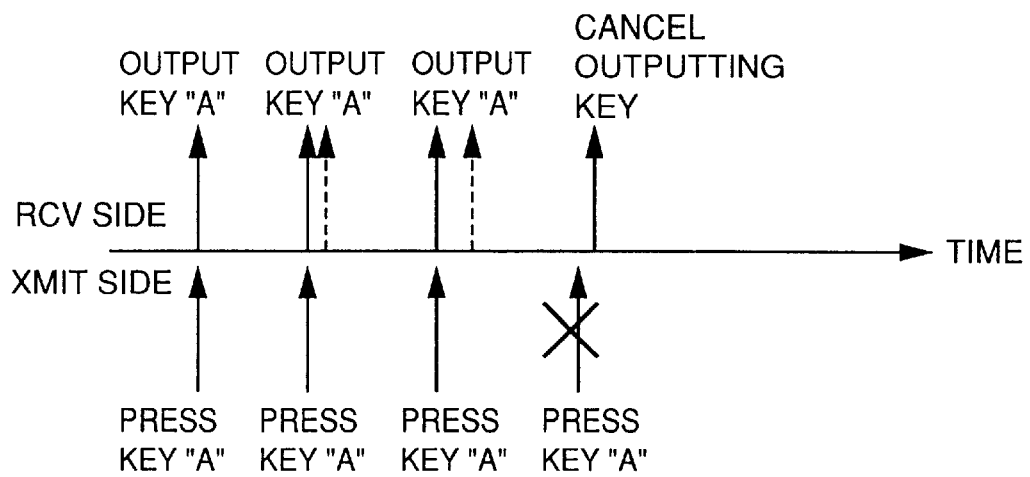
FIG. 1 is a diagram for illustrating an operation of an information transmission process in accordance with the present invention.
Figure 2:
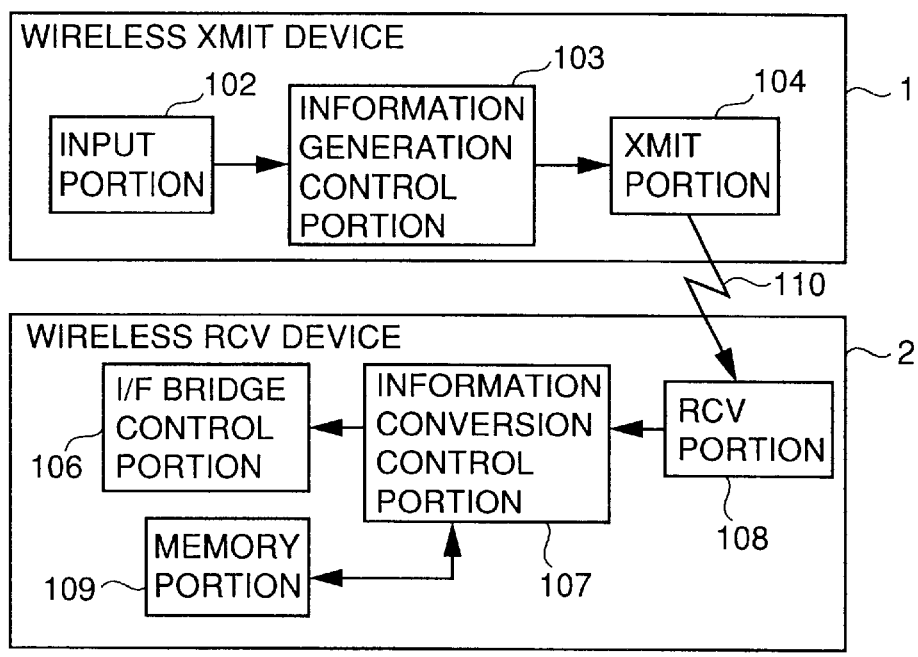
FIG. 2 is a block diagram showing a configuration of a wireless information transmission system according to first and second embodiments of the present invention.

As shown in FIG. 2, the wireless information transmission system includes a wireless transmit device 1 transmitting information by wireless signal, and a wireless receive device 2 receiving information transmitted from wireless transmit device 1.

Wireless transmit device 1 includes an input portion 102 for a user to input an instruction therethrough, an information generation control portion 103 connected to input portion 102 to respond to a signal from input portion 102 for generating data in a predetermined format, and a transmit portion 104 connected to information generation control portion 103 to receive an output from information generation control portion 103 and convert it to a wireless signal 110 for external transmission. Wireless signal 110 may be radio frequency (RF) signal, infrared signal or the like.

Wireless receive device 2 includes a receive portion 108 receiving wireless signal 110 transmitted from wireless transmit device 1, an information conversion control portion 107 connected to receive portion 108 to receive an output from receive portion 108 and convert and reconstruct it in a predetermined format and also storing as required the converted and reconstructed data to a memory unit 109 described hereinafter to refer to the data of interest and data stored in memory portion 109 to control an interface (I/F) bridge control portion 106 described hereinafter, a memory portion 109 connected to information conversion control portion 107 to temporarily store data, and an I/F bridge control portion 106 connected to information conversion control portion 107 to receive data from information conversion control portion 107 and pass the data according to an appropriate procedure to an application program (not shown) operating in wireless receive device 2. The application program herein is adapted to have the auto-repeat function described hereinbefore and may also be replaced by an operating system (OS).

Each portion of wireless transmit device 1 will now be described in greater detail.

Input portion 102 corresponds to equipment having a single or multiple input key(s) button(s) touch panel(s) and the like, such as a mouse, a keyboard, a game pad, a joy stick, a remote controller. Input portion 102 indicates to information generation control portion 103 a signal indicative of an event resulting from a user operation directed to input portion 102, such as pressing a key, releasing a button, and the like.

In the description hereinafter, in input portion 102 an event occurs in conjunction with operating a key, although the key is replaced by a button provided physically. It may also be an area on a touch panel that is divided by a boundary and thus formed selectably.

Information generation control portion 103 corresponds for example to a controller, such as a single or multiple integrated circuits (ICs). Information generation control portion 103, as has been described above, exerts control over wireless transmission via transmit portion 104 of a signal output from input portion 102. Furthermore, information generation control portion 103 also functions as a timer so that a required process can be executed periodically as defined.

Each portion of wireless receive device 2 will now be described in greater detail.

Information conversion control portion 107 corresponds to a controller, such as a single or multiple ICs. Information conversion control portion 107 functions as described above and also as a timer so that a required process can be executed periodically as defined.

Figure 3:
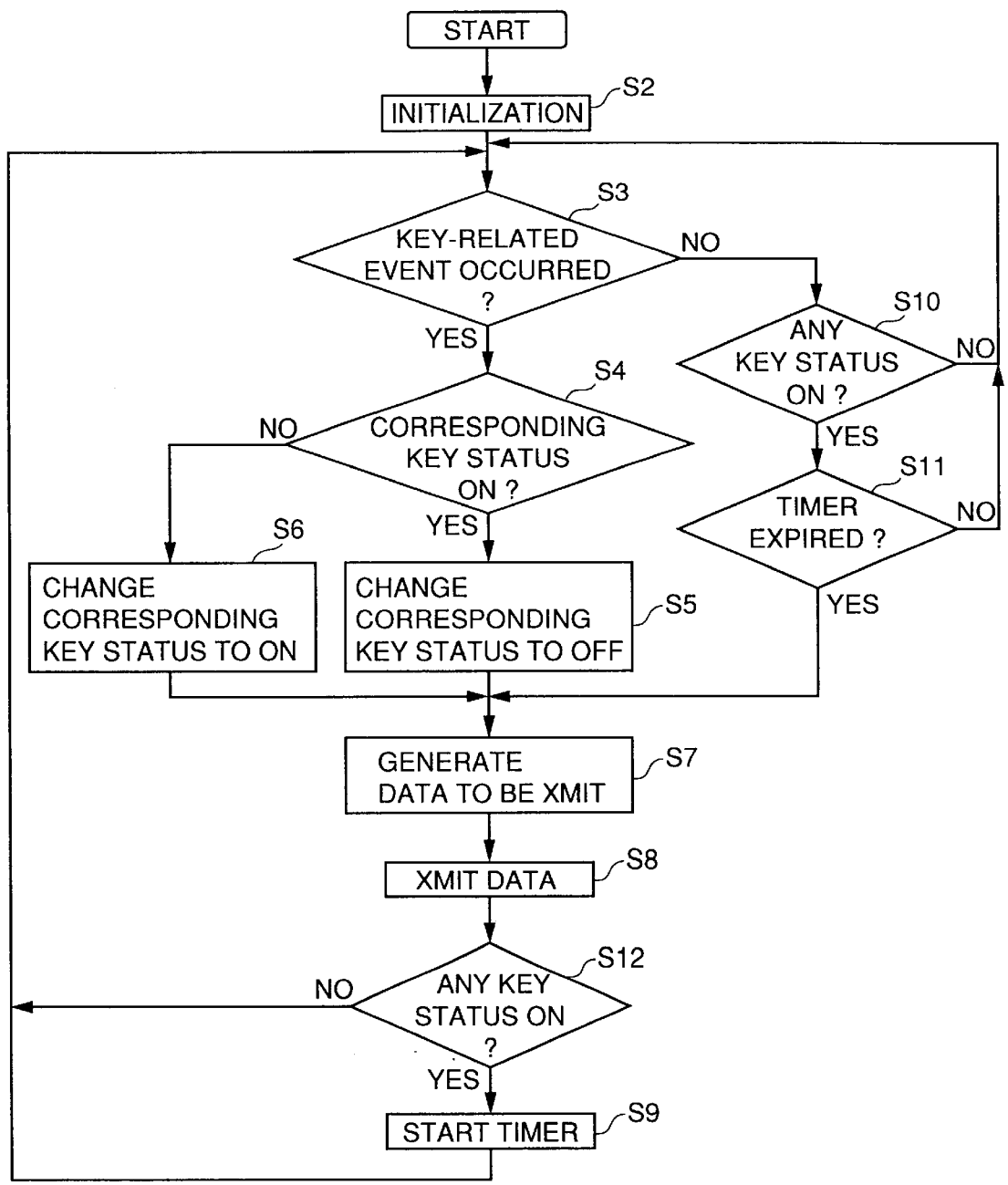
FIG. 3 is a flow chart of a data transmit process according to a first embodiment.

Reference will now be made to FIG. 3 to describe a data transmit process provided by information generation control portion 103 of wireless transmit device 1.

Information generation control portion 103 initializes itself (S2). More specifically, when in input portion 102 a key is pressed for input or a key is released, information generation control portion 103 detects such event and renders a wireless signal transmittable. Information generation control portion 103 detects whether a key-related event has occurred (S3). If an event corresponding to pressing a key for input or releasing a key has occurred (YES at S3), information generation control portion 103 determines which key is related to the event and checks the status of the key (S4). Each key can have the status whether ON or OFF. When a key is pressed it has the ON status, and when a key is released it has the OFF status.

Checking a key's status allows a decision to be made as to whether initially pressing the key or releasing the key has caused an event.

If initially pressing a specific key for input causes an event, the key has the OFF status (NO at S4) and is thus changed from OFF to ON. If an event that a key is released occurs, the key has the ON state (YES at S4) and is thus changed from ON to OFF (S5). If while a specific key is ON another key is pressed for an additional input, information generation control portion 103 may switch the latter key to the ON status and the former key, having had the ON status, to the OFF status, although this requires that a Release Key event should be adapted for any key.

After the S5 or S6 step, information generation control portion 103 generates data to be transmitted to wireless receive device 2 (S7). As such, a result of identifying a key that is received from input portion 102 is converted into an appropriate key code or a data format.

Transmit portion 104 converts data generated to be transmitted to wireless receive device 2 into a wireless signal and transmits the wireless signal to wireless receive device 2 (S8).

After the data is transmitted to wireless receive device 2, key statuses of all keys are checked (S 12). If there is a key in the ON state (YES at S12) then information generation control portion 103 starts a timer counting a defined time period in order to transmit the key's data to wireless receive device 2 whenever the defined time period elapses (S9). And then returns to S3. If there is no key in the ON status (NO at S12), the timer is not started and returns to S3.

If no key events are detected in S3 (NO at S3), key status of all keys are checked (S10). If all keys have the OFF status, information generation control portion 103 determines that any key is not pressed (NO at S10) and goes to S3 key event detection. If any key has the ON key status, it determines that there is a pressed key (YES at S10) and information generation control portion 103 determines whether the timer has reached the defined time (S11). If the timer has not yet expired (NO at S11), the S3 key event detection is continued.

If the timer has expired (YES at S11), then data to be transmitted is generated (S7) and thus transmitted to wireless receive device 2 (S8). The data transmitted to wireless receive device 2 is identical to that previously transmitted to wireless receive device 2. Thus the same data is transmitted constantly whenever with a specific key being pressed the timer has counted the defined period of time (YES at S11).

When a key continuously pressed is released, the Release Key event is detected at S3 (YES at S3) and the key's status is checked (S4). The key, having the ON status (YES at S4), is updated from the ON status to the OFF status (S5). Key data indicating that the key is released is generated as data to be transmitted and is thus transmitted to wireless receive device 2 (S8). After checking that the status of the key is OFF (NO at S12), it goes back to S3 key event detection.

Figure 4:
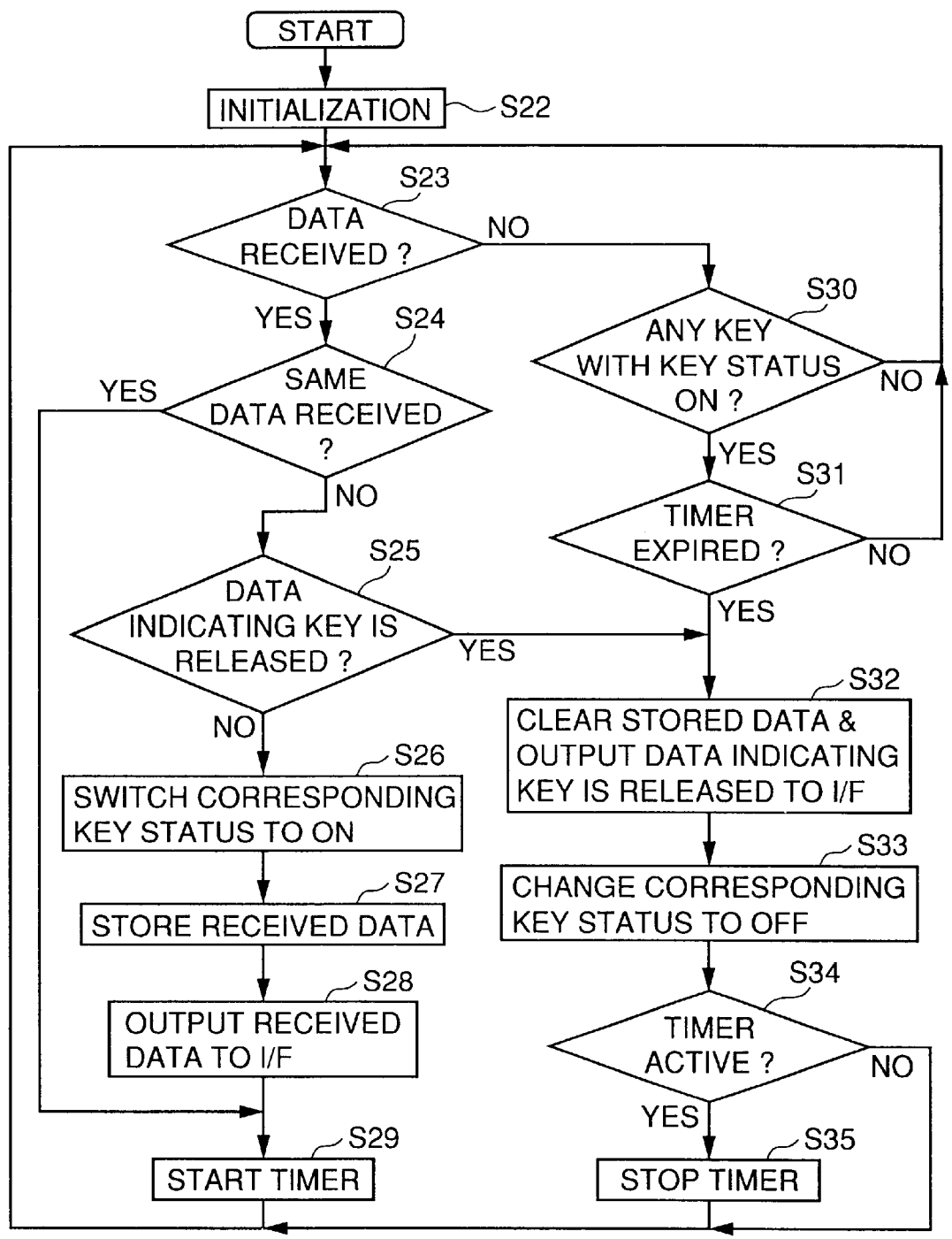
FIG. 4 is a flow chart of a data receive process according to the first embodiment.

Reference will now be made to FIG. 4 to describe a data receive process provided by information conversion control portion 107 of wireless receive device 2.

Information conversion control portion 107 performs an initialization step (S22). This initializes memory portion 109 and I/F bridge control portion 106. Also receive portion 108 is enabled to receive a wireless signal transmitted from wireless transmit device 1.

Information conversion control portion 107 detects whether the device has received data (S23). If it has received any wireless signal (YES at S23), it determines whether the received data is identical to data previously received and stored in memory portion 109 (S24).

If the received data is not identical to the data stored in memory portion 109 (NO at S24), then information conversion control portion 107 checks whether the received data is the key data indicating that a key is pressed for input in input portion 102 of wireless transmit device 1 or that indicating that a key is released therein (S25). More specifically, from the key data a key code is detected to obtain the status of a key corresponding to the key code. If the key status is ON then it indicates that data indicating that previously the same key is pressed for input is received. If the key's status is OFF then it indicates that the key is not pressed.

When a key status is OFF, to indicates that a key is pressed for a new input (NO at S25) the key's status is switched ON (S26). Received data is temporarily stored to memory portion 109 (S27) and then output to I/F bridge control portion 106 (S28). I/F bridge control portion 106 passes the received data to an application program. It should be noted that if while a key has the ON status another key is also pressed for an additional input, information conversion control portion 107 may switch the former key to the OFF status, although this requires that a Release Key event should be adapted for any key.

If data is output to I/F bridge control portion 106 and then within a defined period of time the same data is still not transmitted from wireless transmit device 1, then a decision can be made that in a communication channel a failure has occurred. To make such decision, information conversion control portion 107 starts a timer for counting the defined period of time (S29).

If receive portion 108 receives data identical to that previously received and stored to memory portion 109 (YES at S23 and YES at S24), then immediately moves on to S29 and restarts the timer in order to output data whenever the defined period of time has elapsed, while it does not change any key status.

If receive portion 108 does not receive key data (NO at S23), information conversion control portion 107 checks all keys' key statuses (S30). If all keys have the OFF key status then the controls determines that any key is not pressed (NO at S30) and goes back to S23.

If there exists any key with its key status ON (YES at S30) then information conversion control portion 107 determines whether the timer, which had been set to the defined period of time, has expired or not (S31). If not expired (NO at S31), moves on to S23, the step of detecting received data.

If the time has expired (YES at S31), information conversion control portion 107 erases data stored in memory portion 109 and outputs a code indicating that a key is released to I/F bridge control portion 106 (S32). I/F bridge control portion 106 passes the code, which indicates the key is released, to the application program.

Information conversion control portion 107 changes the key status of interest from ON to OFF (S33). Information conversion control portion 107 checks whether the timer is active (S34). Since the timer has expired and stopped (YES at S34), and then moves on to S23.

If receive portion 108 receives a code indicating that a key is released (YES at S25), information conversion control portion 107 erases data stored in memory portion 109 and outputs a code indicating that the key is released to I/F bridge control portion 106 (S32). I/F bridge control portion 106 passes the code, which indicates the key is released, to the application program.

Information conversion control portion 107 changes the key status of interest from ON to OFF (S33). Information conversion control portion 107 determines whether the timer is active (S34). Since the timer has not yet expired and is still active (NO at S34), it stops the timer for counting the defined period of time (S35) and then moves on to S23.

As such, if any key is being pressed, wireless transmit device 1 transmits data to wireless receive device 2 at predetermined intervals.

Furthermore, if wireless receive device 2 does not receive data it can check key status to independently make a decision to cancel the auto-repeat condition of a key. This allows wireless receive device 2 to cancel a key's auto-repeat condition when a communication channel is disconnected, and wireless transmit device 1 cannot transmit data indicating that the key is released, to wireless receive device 2.

Furthermore, if the defined time period counted by the wireless receive device 2 timer is set to be shorter than the time for the application program to automatically enter a key's auto-repeat condition, the application program can be prevented from entering an unintended auto-repeat condition when a failure occurs in a communication channel.

Furthermore, wireless transmit device 1 is only required to transmit data only for a limited period while a key is being pressed. Thus, wireless transmit device 1 can consume less power. In particular, wireless peripherals such as battery-driven keyboards can consume less power and thus be used for a long period of time.

Second Embodiment

A wireless information transmission system according to a second embodiment of the present invention is similar in hardware configuration to the wireless information transmission system according to the first embodiment described with reference to FIG. 2, and it will thus not be described in detail.

The wireless information transmission system of the second embodiment is partially different from that of the first embodiment in the data transmit process performed by information generation control portion 103 of wireless transmit device 1, and the data receive process performed by information conversion control portion 107 of wireless receive device 2. Hereinafter, each process will be described, with such difference focused on.

Figure 5:
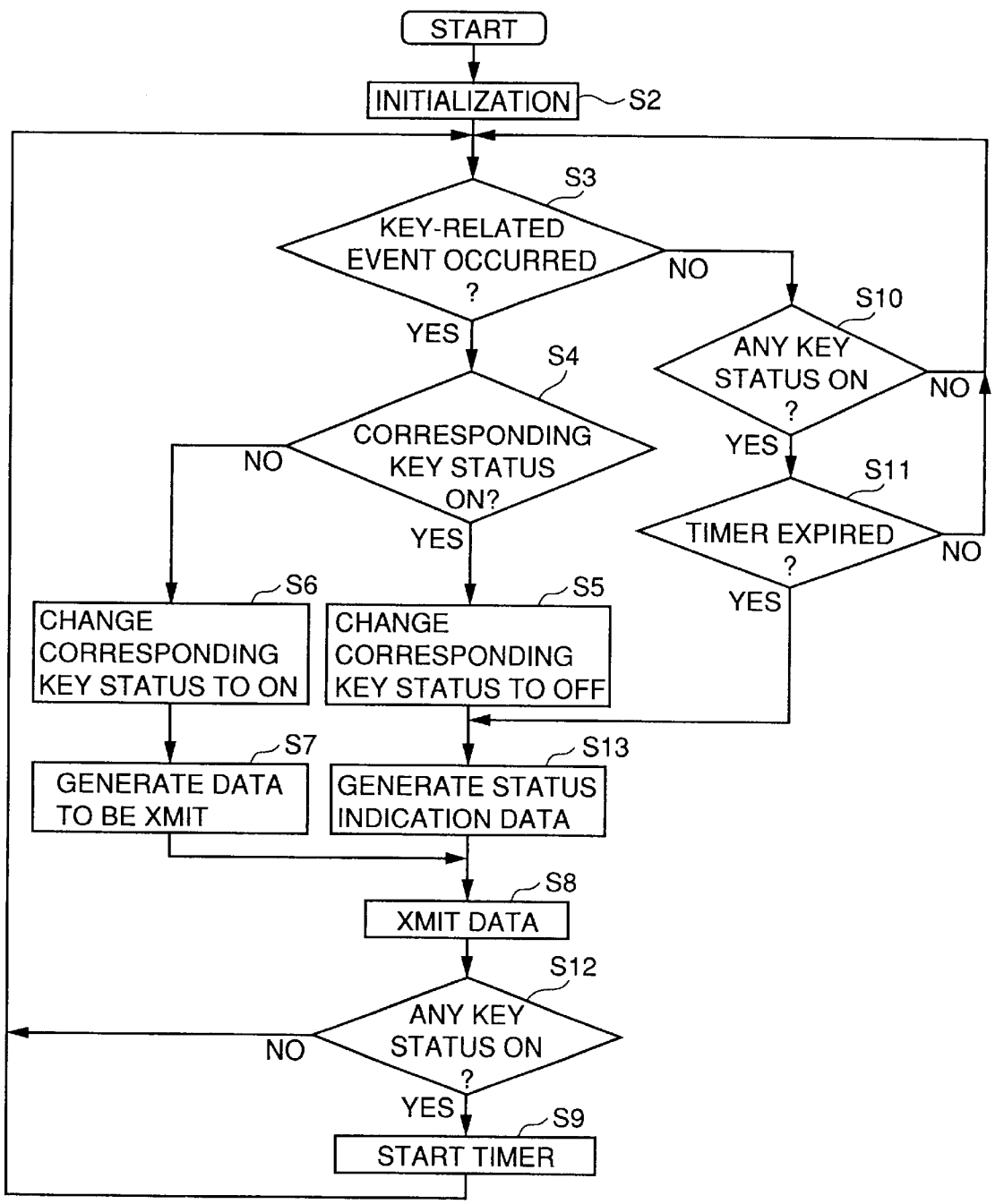
FIG. 5 is a flow chart of a data transmit process according to the second embodiment.

Reference will now be made to FIG. 5 to describe a data transmit process provided by information generation control portion 103 of wireless transmit device 1. The FIG. 3 data transmit process according to the first embodiment, with a key being pressed, transmits the same data whenever a defined period of time elapses. The data transmit process according to the second embodiment, with a key being pressed, also transmits data whenever a defined period of time elapses, although it has the feature that it transmits status indication data as described hereinafter.

Any process steps in FIG. 5 similar to those in FIG. 3 are denoted by the same reference characters and will not be described in detail.

If an event that a key is released occurs, the key's key status should be ON (YES at S3, YES at S4) and information generation control portion 103 thus changes the key status related to the key from ON to OFF (S5). Information generation control portion 103 generates status indication of which the key is released (S 13). Status indication data is data with an attached identifier discriminably different from key data itself, and has describes either a Key Pressed or a Key Released state. In other words, status indication is not required to have key code-related information or key code itself. Status indication data indicating that a key is released is transmitted to wireless receive device 2 (S8).

If with a key being pressed, the timer has expired in a defined period of time (YES at S10, YES at S11), information generation control portion 103 generates status indication data indicating the Key Pressed state (S13) and transmits the status indication data to wireless receive device 2 (S8).

Figure 6:
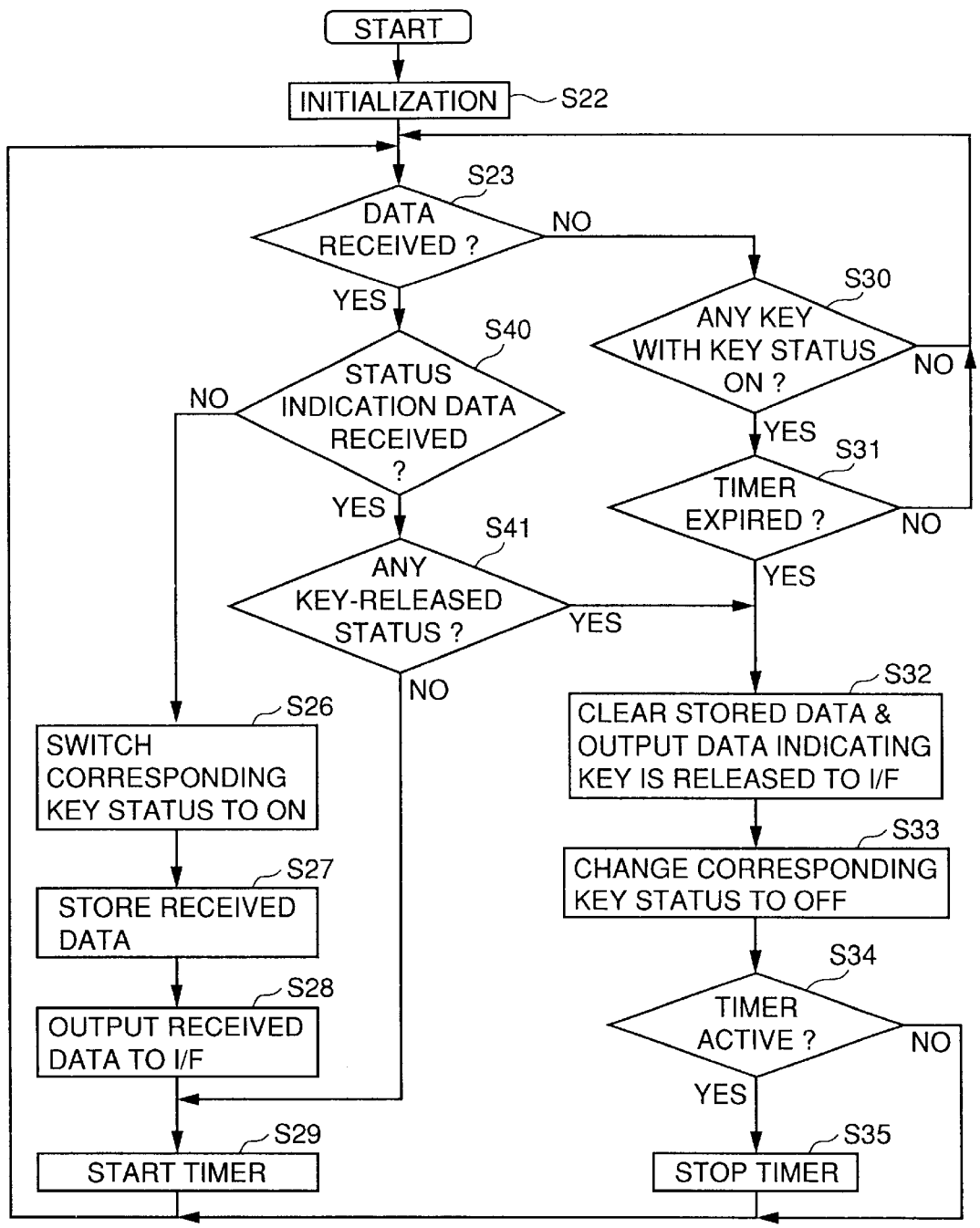
FIG. 6 is a flow chart of a data receive process according to the second embodiment.

Reference will now be made to FIG. 6 to describe the data receive process provided by information conversion control portion 107 of wireless receive device 2. While the judgement whether the same data is received and whether data indicating that a key is released is received, are made with reference to key data in the data receive process shown in FIG. 4, such judgement are made with reference to status indication data in FIG. 6.

Any process steps of FIG. 6 that are similar to those of FIG. 4 are denoted by the same reference characters and will not be described in detail.

When any wireless data is received (YES at S23), information conversion control portion 107 determines whether the received data is status indication data (S40). If the received data is status indication data (YES at S40), then the data's contents are examined (S42). If the status indication data indicates that a key is released (YES at S41), moves to S32 step and outputs the data indicating that the key is released to I/F bridge control portion 106.

If status indication data indicates that a key is pressed (NO at S41), S29 step and those subsequent thereto are performed. More specifically, information conversion control portion 107 starts timer to count a defined period of time to determine whether any failure has occurred in a communication channel.

If received data is not status indication data (NO at S40), that means that normal key data has been received and in the S26 process step and those subsequent thereto a data output process is provided.

In the second embodiment, key data is replaced by status indication data and transmitted as appropriate. Since the status indication data does not include a key code and thus has a smaller amount of information than key data itself. This can minimize the amount of data flowing through a communication channel, as required, and as a result can achieve a reduced power consumption.

Third Embodiment

Figure 7:
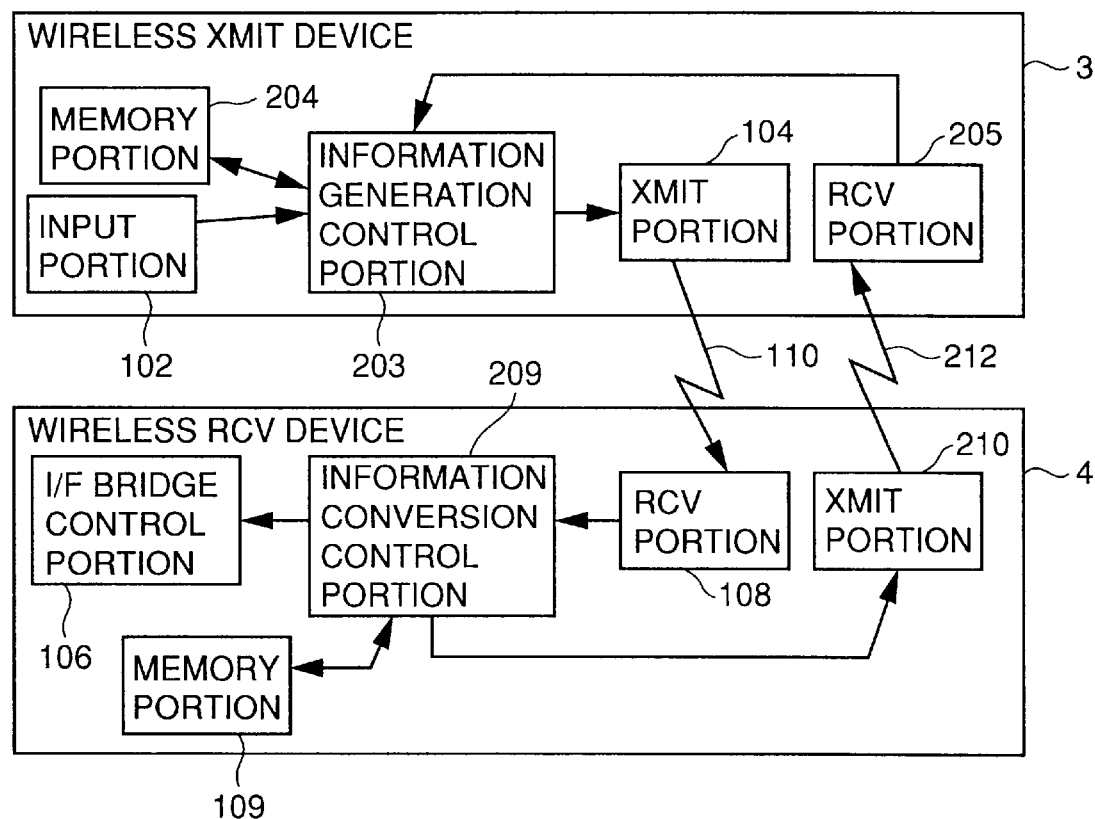
FIG. 7 is a block diagram showing a configuration of a wireless information transmission system according to third, fourth and fifth embodiments of the present invention.

As shown in FIG. 7, a wireless information transmission system according to a third embodiment of the present invention includes a wireless transmit device 3 transmitting and receiving information by wireless signal, and a wireless receive device 4 receiving information transmitted from wireless transmit device 3 and also transmitting information to wireless transmit device 3.

Wireless transmit device 3 includes an input portion 102 for a user to input instructions therethrough, and an information generation control portion 203 connected to input portion 102, a memory portion 204 (described hereinafter), a transmit portion 104 (described hereinafter) and a receive portion 205 (described hereinafter), to receive a signal from input portion 102 and based thereon generate data in a predetermined format for external transmission via transmit portion 104 as well as for temporarily storage to memory portion 204.

Wireless transmit device 3 also includes a memory portion 204 connected to information generation control portion 203 for temporarily storing data generated in information generation control portion 203, a transmit portion 104 connected to information generation control portion 203 to receive data from information generation control portion 203 and convert the data to a wireless signal 110 for external transmission, and a receive portion 205 connected to information generation control portion 203 to output externally received data to information generation control portion 203.

Wireless receive device 4 includes a receive portion 108 receiving wireless signal 110 transmitted from wireless transmit device 1, and an information conversion control portion 209 connected to receive portion 108 to receive data from receive portion 108 and convert the received data in a predetermined format for storage to a memory portion 109 described later as well as for output to an I/F bridge control portion 109 (described hereinafter), and also to transmit predetermined data to wireless transmit device 3 via a transmit portion 210 (described hereinafter).

Wireless receive device 4 also includes a memory portion 109 connected to information conversion control portion 209 for temporarily storing data, an I/F bridge control portion 106 connected to information conversion control portion 209 to receive data from information conversion control portion 209 and pass the data according to an appropriate procedure to an application program (not shown) operating in wireless receive device 4, and a transmit portion 210 connected to information conversion control portion 209 to receive data output from information conversion control portion 209 and convert the data to transmittable data for transmission to wireless transmit device 3 by wireless signal.

The wireless transmit device's information generation control portion 203 will now be described in greater detail. Information generation control portion 203 corresponds to a controller, such as a single IC or multiple ICs. As described above, information generation control portion 203 exerts control over wireless transmission via transmit portion 104 of a signal output from input portion 102 and also interprets control data received by receive portion 205, and provides a process based on that control data. Information generation control portion 203 uses memory portion 204 to store communicated data temporarily, and refer to it.

The wireless receive device's information conversion control portion 209 will now be described in greater detail. Information conversion control portion 209 corresponds to a controller, such as a single IC or multiple ICs. Information conversion control portion 209 can function as described above and also as a timer to allow a required process to be provided whenever a defined period of time elapses. Furthermore, information conversion control portion 209 generates control data and transmit it to wireless transmit device 3 via transmit portion 210, by using data received from received portion 108 and a result of process of the timer function.

Figure 8:
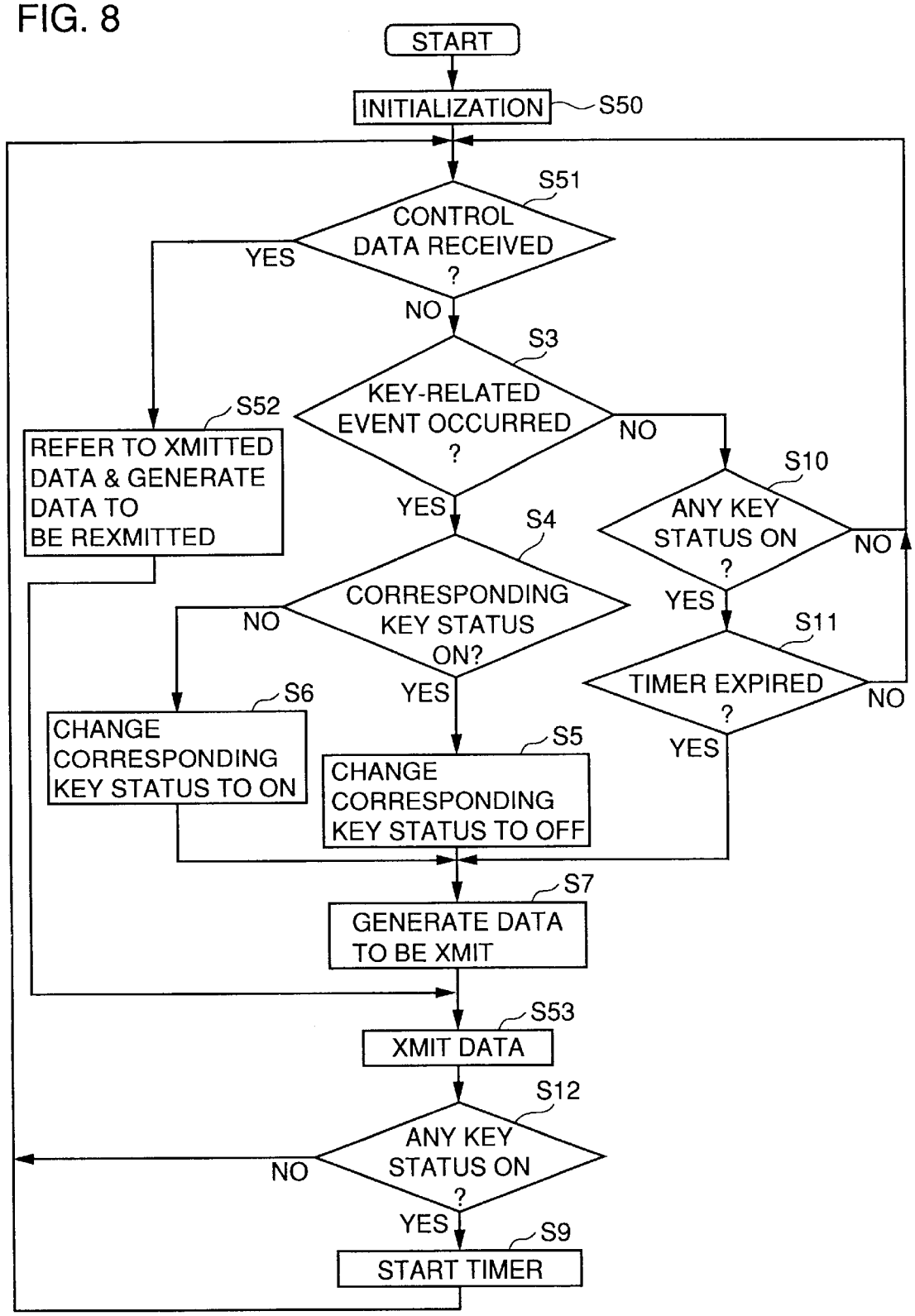
FIG. 8 is a flow chart of a data transmit process according to the third embodiment.

Reference will now be made to FIG. 8 to describe a data transmit process performed by information generation control portion 203 of wireless transmit device 3. It should be noted that in the following description any steps similar to those in FIG. 3 are denoted by the same reference characters and will thus not be described in detail.

Information generation control portion 203 executes an initialization step (S50). In this initialization step, information generation control portion 203 is rendered capable of detecting an event that a key is pressed for input and an event that a key is released and transmit portion 104 is also rendered capable of transmitting wireless signal 110 as well as receive portion 205 is rendered capable of receiving a wireless signal 212 transmitted from wireless receive device 4 and including control data.

After the initialization step (S50), information generation control portion 203 determines whether receive portion 205 has received control data from wireless receive device 4 (S50).

If so (YES at S51), information generation control portion 203 refers to data stored in memory portion 204 that has been transmitted and thus generates data to be retransmitted to retransmit the same data to wireless receive device 4 (S52). After that, the data for retransmission is transmitted to wireless receive device 4 via transmit portion 104. Furthermore, information generation control portion 203 stores the transmitted data to memory portion 204 (S53). Thereafter, S12 step and those subsequent thereto are performed.

Figure 9:
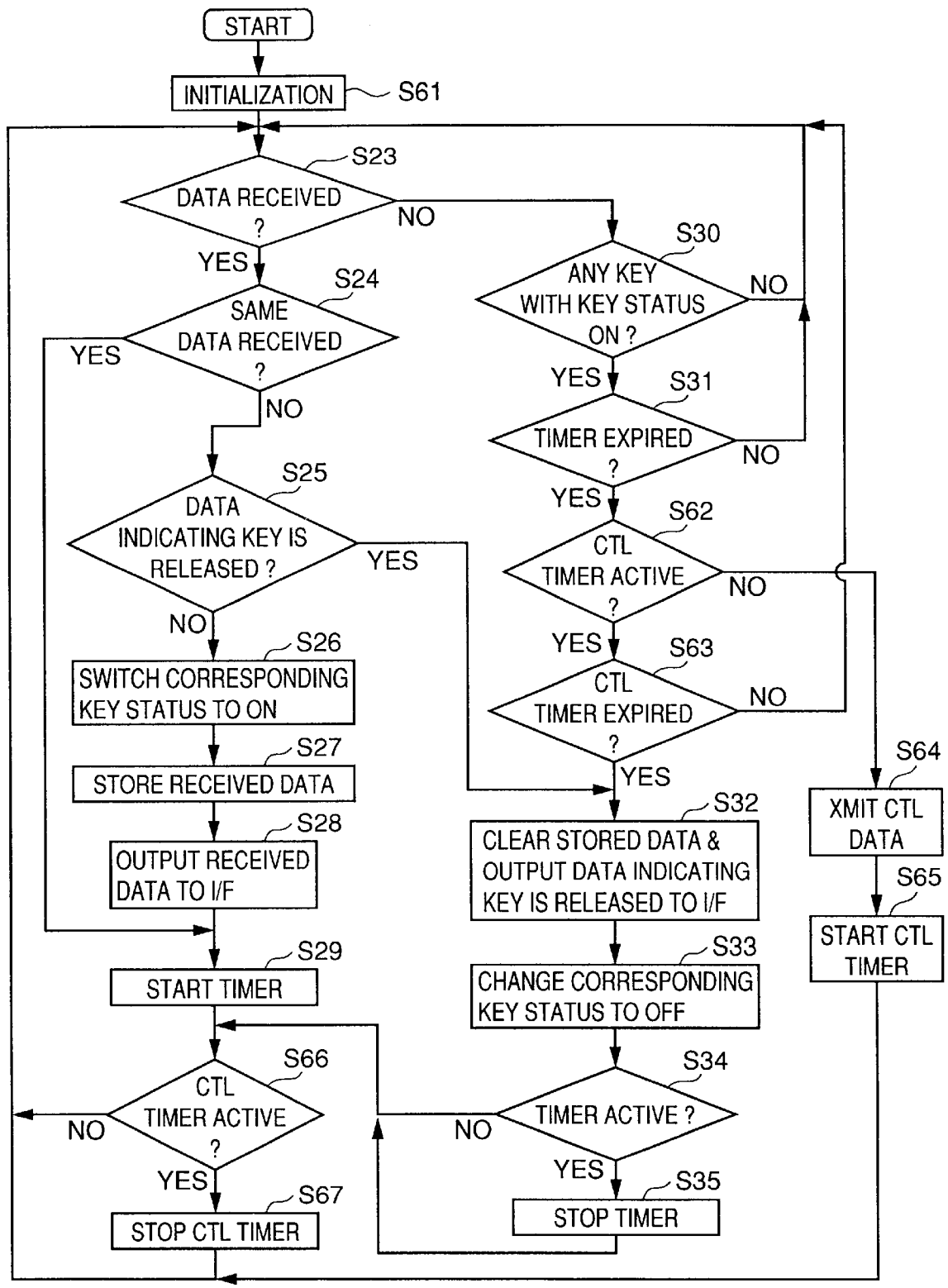
FIG. 9 is a flow chart of a data receive process according to the third embodiment.

Reference will now be made to FIG. 9 to describe a data receive process provided by information conversion control portion 209 of wireless receive device 4. It should be noted that in the following description any process steps similar to those shown in FIG. 4 are denoted by the same reference characters and will thus not be described in detail.

Information conversion control portion 209 executes an initialization step (S61). In this initialization step, memory portion 109 and I/F bridge control portion 106 are initialized and transmit portion 210 is also initialized to render control data in wireless signal 212 transmittable to wireless transmit device 3.

After the initialization step, information conversion control portion 107 detects whether data is received (S23). If any wireless signal is received (YES at S23), information conversion control portion 107 determines whether the received data matches the data stored in memory portion 109 that has already been received.

If the received data does not match the previously received data stored in memory portion 109 (NO at S24), then information generation control portion 203 determines whether the received data is that indicating a key is released (S25). If the received data is that indicating a key is pressed for input (NO at S25), then the key has its status switched ON (S26) and the received data is stored to memory portion 109 (S27). Information conversion control portion 209 outputs the same data to I/F bridge control portion 106 (S28). I/F bridge control portion 106 passes the received data to the application program. After that, information conversion control portion 209 starts timer to count a defined period of time to detect a communication failure (S29).

Subsequently, information conversion control portion 209 determines whether a control timer is active (S66). The control timer is different in type from the timer counting the defined period of time and it is used to determine whether wireless transmit device 3 responds to a request to retransmit data. It should be noted that, as will be described hereinafter, a request to retransmit data is transmitted from transmit portion 210 to the wireless receive device after the timer counting the defined time period has expired.

Normally, the control timer has an expiration time set to be equal to or shorter than that of the timer started at the S29 step for counting the defined period of time.

If at a timing at which the controls moves on to S66, from wireless transmit device 3 wireless data is received or data indicating that a key is released has been output, then it is not necessary to activate the control timer for checking for data retransmission. As such, information conversion control portion 209 checks whether the control timer is active (S66) and if it is active (YES at S66), stops it (S67) and moves on to S23. If the control timer is not active (NO at S66) then information conversion control portion 209 does not provide any processes and moves on to S23.

If in the S31 step the controls determines that the timer for counting the defined period of time has expired and within the defined period of time the expected data is not received from wireless transmit device 3 (YES at S31) then information conversion control portion 209 determines whether the control timer is active (S62).

If the control timer is not active (NO at S62) then information conversion control portion 209 transmits control data indicating a request to retransmit the data, to wireless transmit device 3 via transmit portion 210 (S64). Simultaneously, information conversion control portion 209 starts the control timer (S65). The control timer is, as described above, a timer used for determining the presence/absence of the wireless transmit device's response to the control data from the wireless receive device 4 indicating a request for data retransmission. After starting the control timer in S65, the controls moves on to S23.

The control data transmitted in S64 step is a request for retransmitting data, attempting for example to recover a communication channel determined as unrecoverable if the data is not received before the control timer, which started at S65, is expired.

If the control timer has been started (YES at S62), the control timer is checked whether it is expired or not(S63). If not (NO at S63) then the controls moves on to S23.

If the control timer has expired (YES at S63), a decision can be made that a communication channel is disconnected due to a fault and thus unrecoverable. As such, information conversion control portion 209 erases data stored in memory portion 109 and outputs a code indicating that a key is released to I/F bridge control portion 106 (S32). I/F bridge control portion 106 passes the code indicating that the key is released to the application program.

Information conversion control portion 209 changes the key's status from ON to OFF (S33) and determines whether the timer for counting the defined time is active (S34).

If it is not active (NO at S34) then moves on to S66, and if it is active (YES at S34) then the information conversion control portion 209 stops it (S35) and then moves on to S66.

As such, if wireless receive device 4 fails to receive data within a defined period of time it can transmit to wireless transmit device 3 a request for retransmitting the data. After the request for retransmitting data transmission and expiration of a predetermined period of time, if the data is not received, then a decision is made that a failure has occurred in a communication channel, and data indicating that a key is released is outputted to I/F bridge control portion 106. As such, if for example a communication channel is disconnected and wireless transmit device 3 cannot transmit to wireless receive device 4 data indicating that a key is released, wireless receive device 4 can cancel the key's auto-repeat condition.

Fourth Embodiment

A wireless information transmission system according to a fourth embodiment of the present invention is similar in hardware configuration to that according to the third embodiment described with reference to FIG. 7 and it will thus not be described in detail.

The wireless information transmission system according to the fourth embodiment is partially different from wireless transmit device 3 in the data transmit process provided by information generation control portion 203 of wireless transmit device 3, and the data receive process provided by information conversion control portion 209 of wireless receive device 4. Hereinafter each process will be described with such difference focused on.

Figure 10:
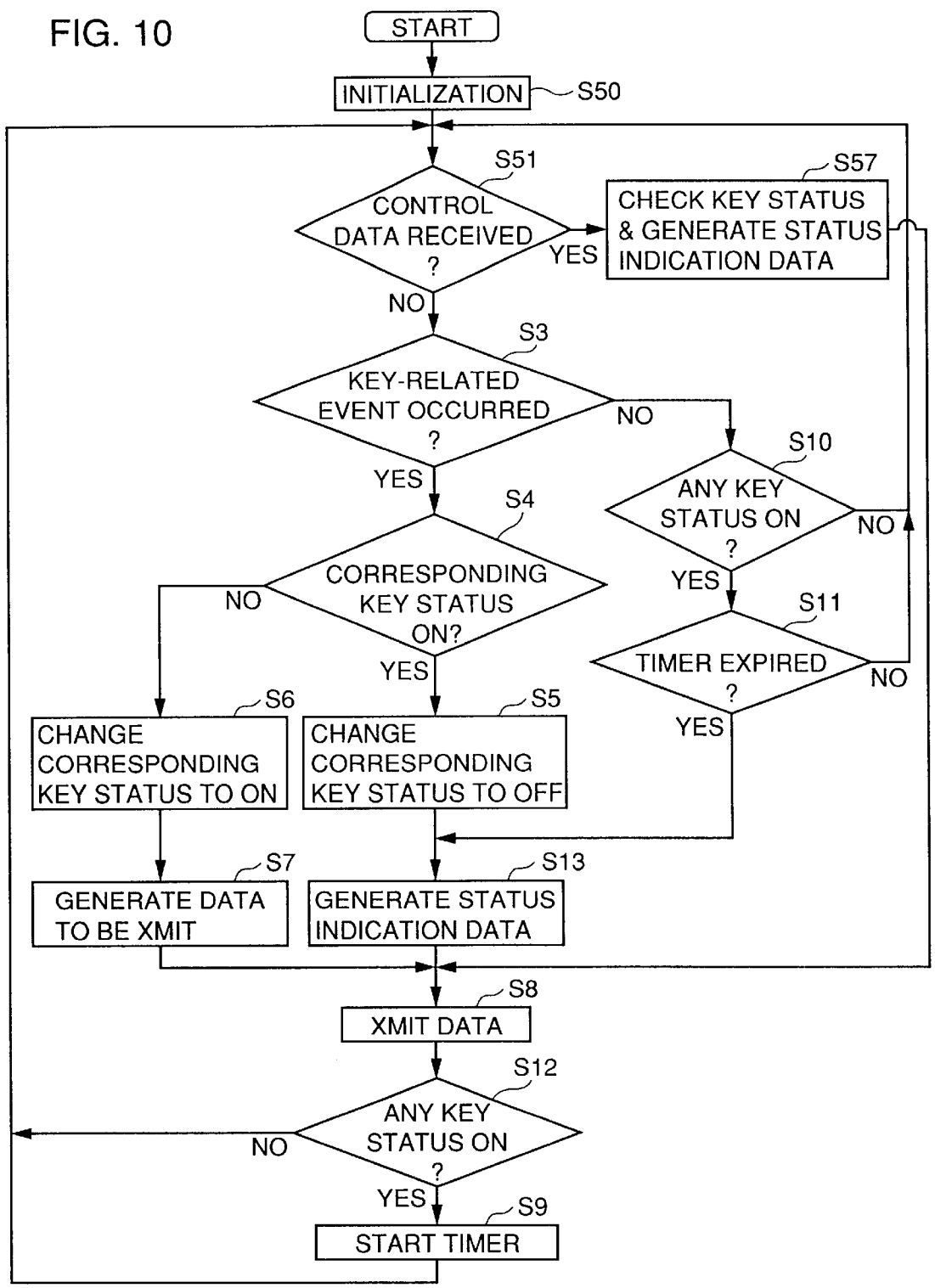
FIG. 10 is a flow chart of a data transmit process according to the fourth embodiment.

Reference will now be made to FIG. 10 to describe the data transmit process provided by information generation control portion 203 of wireless transmit device 3. The FIG. 8 data transmit process, with a key being pressed, transmits the same data. The FIG. 10 data transmit process also transmits data whenever a defined period of time elapses, although it is distinguished from the FIG. 8 data transmit process in that it transmits the status indication data described in the second embodiment.

Any steps in FIG. 8 that are similar to those in FIG. 5 are denoted by the same reference characters and will thus not be described in detail.

After an initialization step (S50), information generation control portion 203 determines whether receive portion 205 has received control data from wireless receive device 4 (S51).

If receive portion 205 has received the control data (YES at S51), then information generation control portion 203 checks all keys' key statuses and generates status indication data matching a result of checking the key statuses (S57). More specifically, if any key is not pressed, information generation control portion 203 generates status indication data indicative of a Key Released state. Otherwise, it generates status indication data indicative of the Key Pressed state.

The generated data is transmitted to wireless receive device 4 (S8). S8 step and those subsequent thereto are provided. The other process steps are similar to those in the FIG. 5 data transmit process, and will thus not be described in detail.

Figure 11:
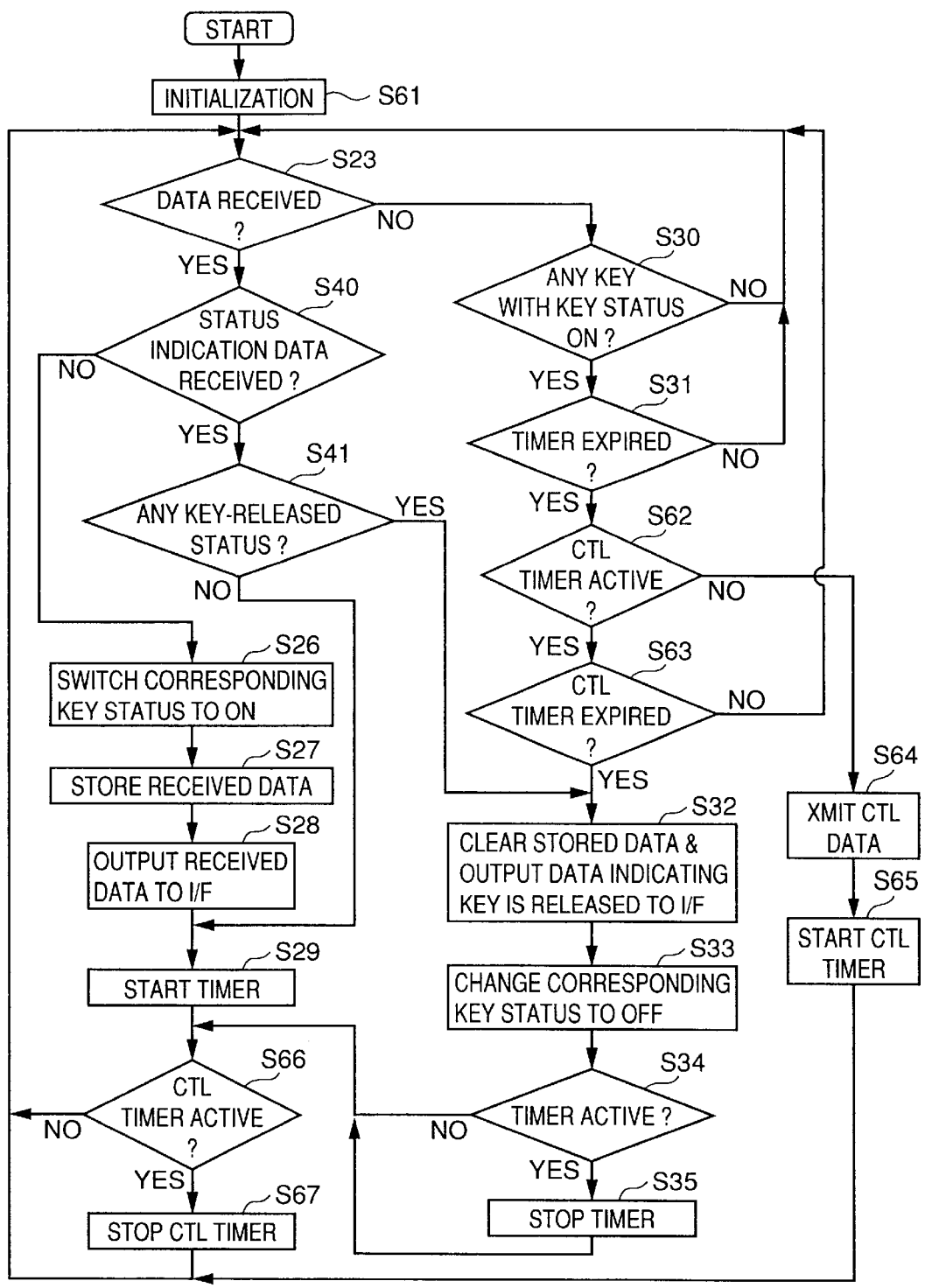
FIG. 11 is a flow chart of a data receive process according to the fourth embodiment.

Reference will now be made to FIG. 11 to describe the data receive process provided by information conversion control portion 209 of wireless receive device 4. In the FIG. 9 data receive process, whether the same data has been received and whether data indicating that a key is released are determined with reference to key data. In contrast, in the FIG. 11 data receive process such decisions are made with reference to status indication data.

Any process steps similar to those in FIG. 9 are denoted by the same reference characters and will thus not be described in detail.

After any reception of wireless data is detected at S23 (YES at S23), information conversion control portion 209 determines whether the received data is status indication data (S40).

If the received data is not status indication data (NO at S40), that indicates that a key is pressed for a new input, S26 step and those subsequent thereto are thus performed.

If the received data is status indication data (YES at S40), then a content of the status indication data is determined (S41). If the status indication data indicates that a key is released (YES at S41), the S32 step and those subsequent thereto are performed, to output the data indicating that the key is released to I/F bridge control portion 106 (S32).

If the received status indication data indicates that a key is pressed, then the data is used for communication-failure detection and information conversion control portion 209 starts a timer for counting a defined period of time (S29).

After the timer for counting the defined period of time is started at S29, information conversion control portion 209 determines whether a control timer is active (S66). The control timer is different in type from the timer for counting the defined period of time, as described in the third embodiment. The control timer is used to determine the presence/absence of the wireless transmit device's response to a request for data retransmission. It should be noted that a request for data retransmission is transmitted via transmit portion 210 to the wireless receive device, after the timer for counting the defined period of time has been expired.

At a timing to S66 step, if wireless data is received from transmit device 3 or data indicating that a key is released has been output, then it is not necessary to keep active the control timer for checking for data retransmission. As such, information conversion control portion 209 checks whether the control timer has been started (S66) and if it is active (YES at S66), stops the control timer (S67) and moves on to S23. If the control timer is not active (NO at S66) then information conversion control portion 209 does not provide any processes and moves on to S23.

If in S31 step a determination is made that the timer for counting the defined period of time has expired and within the defined period of time. the data that is expected is not received from wireless transmit device 3 (YES at S31), information conversion control portion 209 checks whether the control timer is active (S62).

If the control timer is not active (NO at S62) then information conversion control portion 209 transmits control data indicating a request for data retransmission, to wireless transmit device 3 via transmit portion 210 (S64). Simultaneously, information conversion control portion 209 starts the control timer (S65). The control timer, as described above, is used to determine the presence/absence of response of the wireless transmit device 3 to the control data indicating a request for transmission from wireless receive device 4. After the control timer is started at S65, moves on to S23.

The control data transmitted in S64 step is a request for retransmitting data, attempting for example to recover a communication channel when it is temporarily disconnected. The communication channel is determined as unrecoverble if the data is not received before the control timer, which started at S65, is expired. Normally, the control timer has an expiration time set to be shorter than or equal to that of the timer started at S29 for counting the defined time.

If the control timer has been started (YES at S62), the control timer is checked whether it is expired or not (S63). If not expired (NO at S63), moves on to S23.

If the control timer has expired (YES at S63), then a determination can be made that a communication channel is disconnected due to a fault and thus unrecoverable. As such, information conversion control portion 209 erases data stored in memory portion 109 and outputs a code indicating that a key is released, to I/F bridge control portion 106 (S32). I/F bridge control portion 106 passes the code indicating that the key is released, to the application program.

The other process steps are similar to those in the data receive process described with reference to FIG. 9 and will thus not be described in detail.

As such, if wireless receive device 4 does not receive data for a defined period of time, it transmits a request for retransmitting data to wireless transmit device 3. After the request for retransmitting data and expiration of a predetermined period of time, if the data is not received, then a determination can be made that a failure has occurred in a communication channel, and data indicating that a key is released is outputted to I/F bridge control portion 106. As such, if a communication channel is for example disconnected and wireless transmit device 3 cannot transmit data indicating that a key is released to wireless receive device 4, wireless receive device 4 can cancel auto-repeat condition of the key.

Furthermore, status indication data can replace key data and thus be transmitted, as appropriate. Since the status indication data does not include a key code and thus has a smaller amount of information than key data itself. This can minimize the amount of data flowing through a communication channel, as required, and as a result can achieve a reduced power consumption.

Fifth Embodiment

In a wireless information transmission system according to a fifth embodiment of the present invention is similar in hardware configuration to that according to the third embodiment described with reference to FIG. 7 and will thus not be described in detail.

In the wireless information transmission system according to the fifth embodiment, wireless transmit device 3 transmits key data in response to a permission to transmit information that is transmitted from wireless receive device 4.

The wireless transmit device's information generation control portion 203 waits for a permission to transmit information that is provided from wireless receive device 4 via wireless signal 212. Information generation control portion 203 transmits data, if it held data for transmission, to wireless receive device 4 after such permission for transmission has received. Furthermore, information generation control portion 203 can also have functions to count how many times a permission to transmit information is received, and it can execute a predetermined process for such permission-reception count reaching a predetermined value.

Wireless receive device's information conversion control portion 209 detects a signal received at receive portion 108 and converts the signal to data in a specific format and then passes it to I/F bridge control portion 106. Information conversion control portion 209 also functions to transmit a permission to transmit information, to wireless transmit device 3 via transmit portion 210. Furthermore, information conversion control portion 209 functions to count how many times it has provided the permission to transmit information, and information conversion control portion 209 also functions can perform a predetermined process for such permission count exceeding in value a defined frequency.

Figure 12:
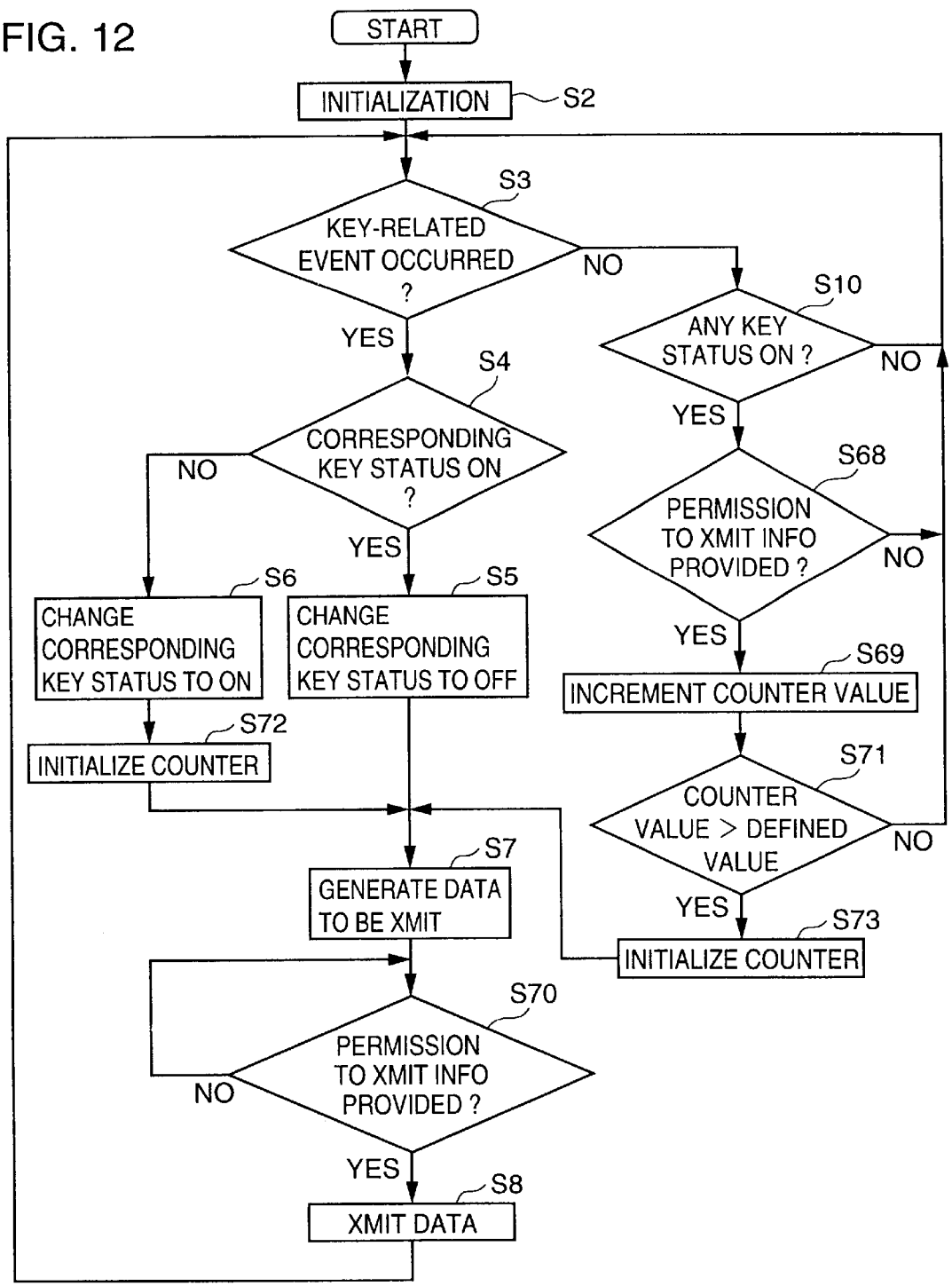
FIG. 12 is a flow chart of a data transmit process according to the fifth embodiment.

Reference will now be made to FIG. 12 to describe the data transmit process provided by information generation control portion 203 of wireless transmit device 3. Information generation control portion 203 waits for a permission to transmit information that is received from wireless receive device 4, and in response to a timing at which such event occurs, information generation control portion 203 transmits data.

Any process steps similar to those in FIG. 3 are denoted by the same reference characters and will thus not be described in detail.

If a key is initially pressed and an event thus occurs (NO at S4) then information generation control portion 203 changes the key's key status to ON (S6) and then initializes a counter (S72). The counter is used for counting how many times permissions for transmission have received from wireless receive device 4. Information generation control portion 203 generates data to be transmitted (S7) and waits for a permission to transmit information that is provided from wireless receive device 4 (S70). When receive portion 205 receives a wireless signal indicating a permission to transmit information (YES at S70), information generation control portion 203 responds to such permission by transmitting data to be transmitted to wireless receive device 4 via transmit portion 104 (S8). After that, goes back to S3.

If any key event does not occur and there is a key with its key status ON (NO at S3, YES at S10) then information generation control portion 203 determines whether wireless transmit device 3 has received a permission to transmit information from wireless receive device 4 (S68). If it is given (YES at S68), then information generation control portion 203 increments the counter value by one (S69) and determines whether the current counter value exceeds the defined value (S71). If it is true (YES at S71), information generation control portion 203 initializes the counter (S73) and generates data to be transmitted for the key with its key status ON (S7) and transmits the data to wireless receive device 4 (S70, S8).

If a permission to transmit information is not provided (NO at S68) or the counter value does not exceed the defined value (NO at S71) then the controls goes back to S3.

According to the process described above, with a key status ON, key data of a key with its key status ON is transmitted to wireless receive device 4 whenever wireless transmit device 3 receives permission to transmit information a defined number of times, from wireless receive device 4.

Figure 13:
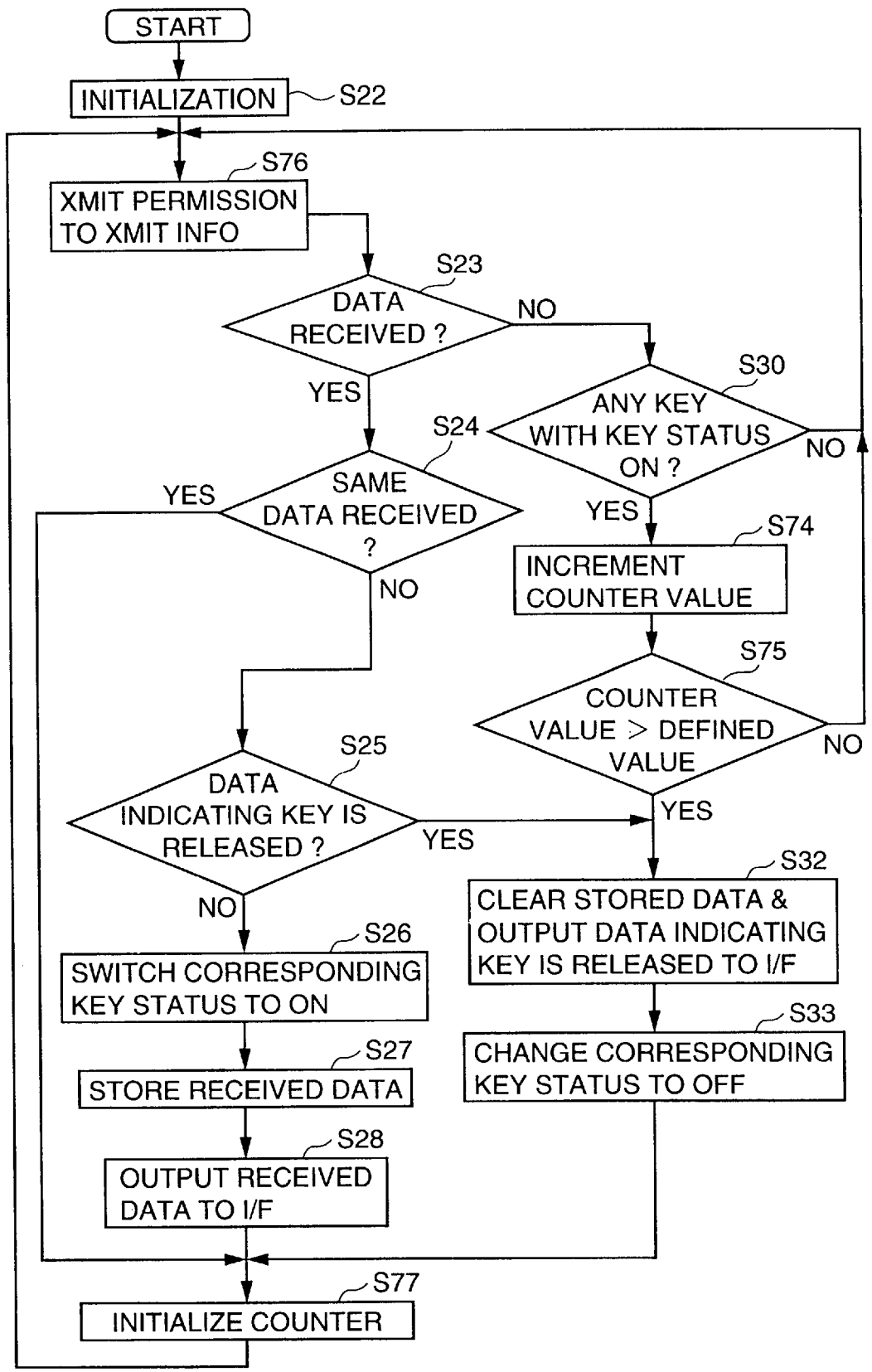
FIG. 13 is a flow chart of a data receive process according to the fifth embodiment.
Figure 14:
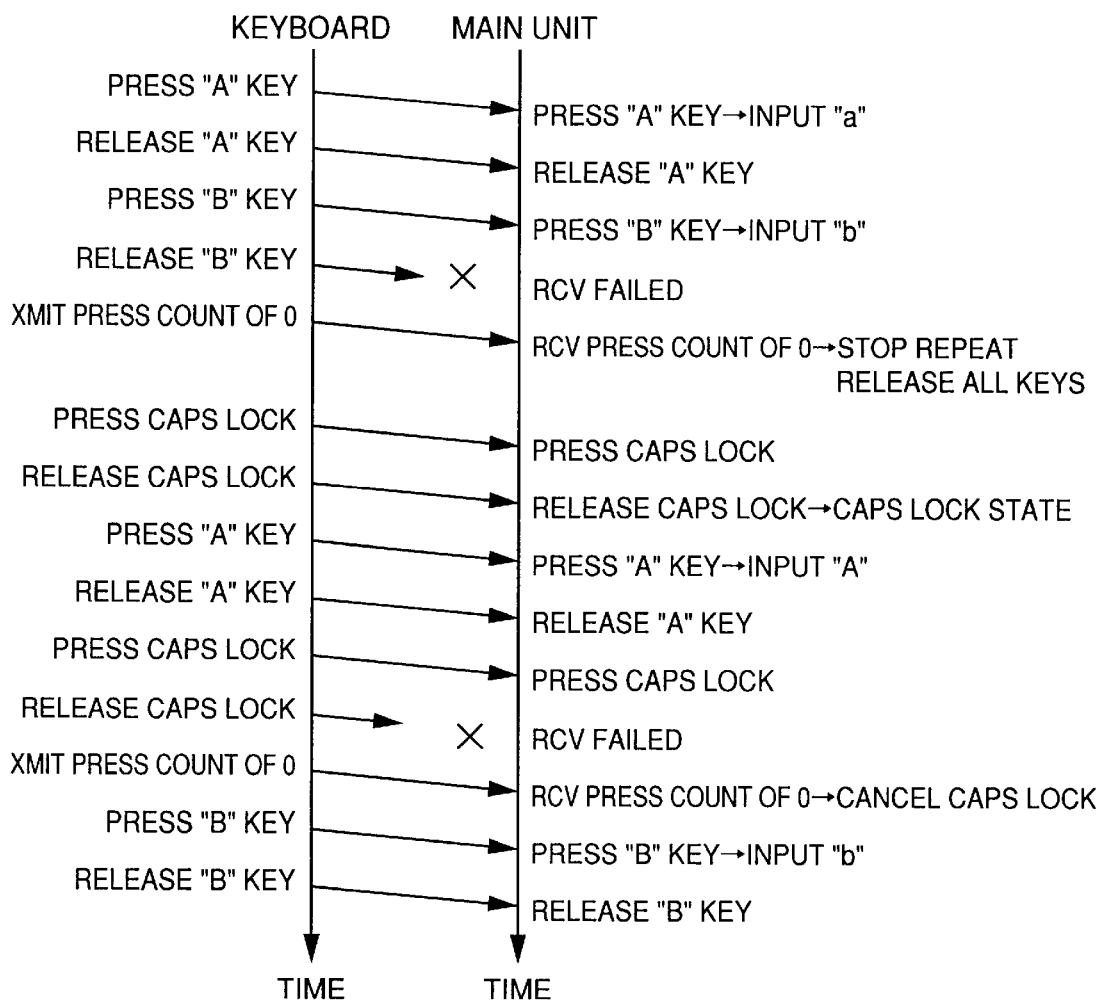
FIG. 14 shows a data flow in a conventional information transmission process.
Figure 15:
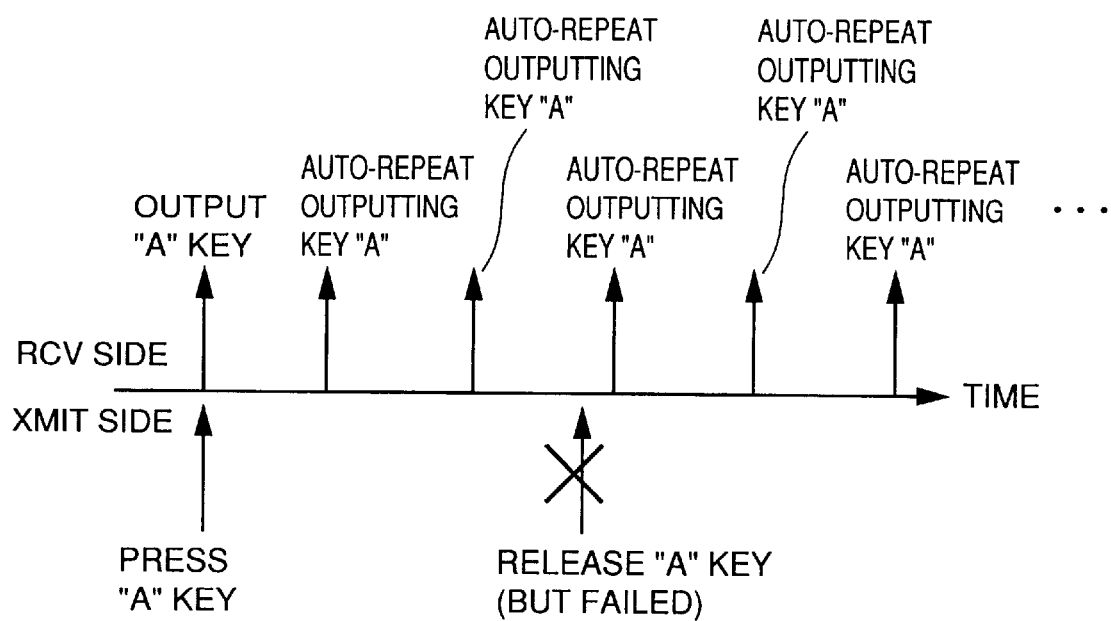
FIG. 15 is a diagram for illustrating a disadvantage of the conventional information transmission process.

Reference will now be made to FIG. 13 to describe the data receive process provided by information conversion control portion 209 of wireless receive device 4. Information conversion control portion 209 have functions to provide a permission to transmit information to wireless transmit device 3.

Any process steps similar to those in FIG. 4 are denoted by the same reference characters and will thus not be described in detail.

After an initialization step (S22), information conversion control portion 209 uses transmit portion 210 to transmit a permission for transmission of data to wireless transmit device 3 (S76). It determines whether data from wireless transmit device 3 is received after providing the permission to transmit (S23). If data is not received, any key's key status is ON (YES at S30), information conversion control portion 209 increments a counter value by one (S74). When the counter value exceeds a defined value, data indicating that the key is released is outputted to I/F bridge control portion 106. It should be noted however that the defined value of the counter in wireless receive device 4 is set to be larger than that of the counter in wireless transmit device 3.

If the counter value exceeds the defined value (YES at S75), information conversion control portion 209 erases data having been stored in memory portion 109 and outputs data indicating that a key is released, to I/F bridge control portion 106 (S32). Furthermore, information conversion control portion 209 changes the key status of the key corresponding to the data indicating that the key is released, to OFF (S33).

If the counter value does not exceed the defined value (NO at S75), goes back to S76.

If receive portion 108 receives data from wireless transmit device 3 or any code including data indicating that a key is released is outputted to I/F bridge control portion 106, the counter is initialized (S77).

As such, wireless transmit device 3 can refer to how many times wireless receive device 4 provides a permission to transmit information to wireless transmit device 3, and can determine the time to generate and transmit data. This can eliminate unnecessary data transmission and also achieve a simplified process as well as a reduced power consumption.

Wireless receive device 4 may be combined with a timer to control a timing at which wireless receive device 4 provides to wireless transmit device 3 a permission to transmit information.

Wireless transmit device 3 may be adapted to transmit the status information described in the second and fourth embodiments when such permission-reception count exceeds a defined value or the same data is transmitted.

The wireless transmit device transmits information to the wireless receive device whenever with a key being pressed for input a defined period of time elapses or whenever a permission to transmit information is received from the wireless receive device a defined number of times. As such, the wireless transmit device with a key being pressed checks consecutively whether the same data is received, and when the data reception stopped, it can determine that a failure has occurred in a communication channel, and the wireless transmit device can provide a process for canceling the auto-repeat condition. As such there can be provided a wireless information transmission system impervious to communication-channel failure.

The defined period of time or defined frequency used to determine whether any failure has occurred in a communication channel can be adjustable. The elapsing time that determines that a failure in the communication channel can be shorter than the time elapsing before entering the auto-repeat condition. This can prevent entering the auto-repeat condition when a failure has occurred in a communication channel.

The wireless transmit device is only required to transmit data during a limited period while a key is being pressed. Thus, wireless peripherals such as a battery-driven keyboard can consume reduced power.

Furthermore, in place of key data normally requiring approximately several bytes, status information can be used to transmit information and thus reduce the amount of information to be transmitted. This can reduce the time required for transmitting information and achieve less power consumption.

Furthermore, if the wireless receive device detects a communication failure, it can transmit control data indicating a request to retransmit data, to the wireless transmit device. As such, more reliable data transmission can be obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A wireless information transmission system comprising:
    a wireless transmit device for transmitting information by wireless signal; and
    a wireless receive device for receiving information transmitted from said wireless transmit device by wireless signal,
    said wireless transmit device including:
        an input portion for a user to input an instruction therethrough,
        a transmit portion for transmitting information to said wireless receive device by wireless signal, and
        an information generation control portion connected to said input portion and said transmit device's transmit portion for transmitting an instruction via said transmit device's transmit portion at predetermined intervals while there is a continuous input instruction from said input portion,
    said wireless receive device including:
        a receive portion for receiving the instruction transmitted from said wireless transmit device by wireless signal, and
        an operation portion connected to said receive device's receive portion to directly receive an output from the receive portion to operate according to the instruction received by said receive device's receive portion.

2. The wireless information transmission system of claim 1, wherein:
    said wireless transmit device also includes a receive portion receiving information transmitted from said wireless receive device by wireless signal; and
    said wireless receive device also includes a transmit portion transmitting information to said wireless transmit device by wireless signal.

3. The wireless information transmission system of claim 2, wherein:
when the instruction from said wireless transmit device is not received for a period of time said operation portion transmits via said receive device's transmit portion to said wireless transmit device a request to retransmit the instruction; and
when said request to retransmit the instruction is received via said transmit device's receive portion said information generation control portion retransmits the instruction via said transmit portion.

4. The wireless information transmission system of claim 3, wherein if a single instruction is continuously transmitted, for any transmission of the single instruction after a first transmission thereof said information generation control portion transmits status information indicating that the same single instruction as initially transmitted is transmitted.

5. The wireless information transmission system of claim 2, wherein when any instruction is not received from said wireless transmit device for a predetermined period of time said operation portion determines that said wireless transmit device completes providing an instruction.

6. The wireless information transmission system of claim 5, wherein if a single instruction is continuously transmitted, for any transmission of the single instruction after a first transmission thereof said information generation control portion transmits status information indicating that the same, single instruction as initially transmitted is transmitted.

7. The wireless information transmission system of claim 2, wherein if a single instruction is continuously transmitted, for any transmission of the single instruction after a first transmission thereof said information generation control portion transmits status information indicating that the same, single instruction as initially transmitted is transmitted.

8. The wireless information transmission system of claim 1, wherein when any instruction is not received from said wireless transmit device for a predetermined period of time said operation portion determines that said wireless transmit device completes providing an instruction.

9. The wireless information transmission system of claim 1, said wireless transmit device also including a receive portion for receiving information transmitted from said wireless receive device by wireless signal,
said wireless receive device also including a transmit portion for transmitting information to said wireless transmit device by wireless signal, wherein:
said information generation control portion responds to an information-transmission permitting signal received from said wireless receive device via said transmit device's receive portion for transmitting the instruction from said input portion to said wireless receive device via said wireless transmit device's transmit portion and, if the instruction is continuously inputted from said input portion, for transmitting the instruction whenever said information-transmission permitting signal is received a first predetermined number of times; and
whenever a predetermined process completes said operation portion transmits said information-transmission permitting signal via said wireless receive device's transmit portion to said wireless transmit device.

10. The wireless information transmission system of claim 9, wherein when in spite that said information-transmission permitting signal is received a second, predetermined number of times any instruction is still not received from said wireless transmit device, said operation portion determines that said wireless transmit device completes providing an instruction.

11. The wireless information transmission system of claim 10, wherein if a single instruction is continuously transmitted, for any transmission of the single instruction after a first transmission thereof said information generation control portion transmits status information indicating that the same, single instruction as initially transmitted is transmitted.

12. The wireless information transmission system of claim 9, wherein if a single instruction is continuously transmitted, for any transmission of the single instruction after a first transmission thereof said information generation control portion transmits status information indicating that the same, single instruction as initially transmitted is transmitted.

13. The wireless information transmission system of claim 1, wherein if a single instruction is continuously transmitted, for any transmission of the single instruction after a first transmission thereof said information generation control portion transmits status information indicating that the same single instruction as initially transmitted is transmitted.

14. In a wireless information transmission system comprising a wireless transmit device transmitting information by wireless signal and a wireless receive device receiving information transmitted from said wireless transmit device by wireless signal, said wireless transmit device including:
an input portion for user to input an instruction therethrough;
a transmit portion for transmitting information to said wireless receive device by wireless signal; and
an information generation control portion connected to said input portion and said transmit portion to transmit instructions via said transmit portion at predetermined intervals while there is a continuous input from said input portion.

15. The wireless transmit device of claim 14, also including a receive portion receiving information transmitted from said wireless receive device by wireless signal.

16. The wireless transmit device of claim 14, also including a receive portion for receiving information transmitted from said wireless receive device by wireless signal, wherein said information generation control portion responds to an information-transmission permitting signal received from said wireless receive device via said transmit device's receive portion for transmitting the instruction from said input portion to said wireless receive device via said transmit device's transmit portion and, while the instruction is continuously inputted from said input portion, for transmitting the instruction whenever said information-transmission permitting signal is received a predetermined number of times.

17. The wireless transmit device of claim 14, wherein if a single instruction is continuously transmitted, for any transmission of the single instruction after a first transmission thereof said information generation control portion transmits status information indicating that the same single instruction as initially transmitted is transmitted.

18. In a wireless information transmission system comprising a wireless transmit device transmitting information by wireless signal and a wireless receive device receiving information transmitted from said wireless transmit device by wireless signal,
said wireless receive device including:
a receive portion receiving an instruction transmitted from said wireless transmit device by wireless signal; and
an operation portion connected to said receive portion to directly receive an output from the receive portion and operating according to an instruction received by said receive portion and determining that said wireless transmit device has completed providing an instruction if any instruction is not received from said wireless transmit device for a predetermined period of time.

19. The wireless receive device of claim 18, also including a transmit portion for transmitting information to said wireless transmit device by wireless signal, wherein whenever a predetermined process completes said operation portion transmits an information-transmission permitting signal via said transmit portion to said wireless transmit device.

20. The wireless receive device of claim 19, wherein when said information transmission permitting signal is received a predetermined number of times and any instruction is still not received from said wireless transmit device, said operation portion determined that said wireless transmit device completes providing an instruction.

* * * * *